Patented Aug. 7, 1928.

1,679,857

UNITED STATES PATENT OFFICE.

TALBOTT HEWITT FRANCE, OF BROOKLYN, NEW YORK.

RECOVERY OF PRECIOUS MINERALS.

No Drawing.  Application filed July 9, 1926. Serial No. 121,496.

This invention relates to the recovery of precious minerals and has for its object the provision of certain improvements in methods of recovering such minerals. More particularly, the invention aims to provide an improved method of disintegrating sedimentary rocks containing such precious minerals as diamonds, carbons, gold, silver, platinum and the like, and the subsequent recovery of the precious minerals.

Where precious minerals are found in the native state associated with a great preponderance of rock, it is usually necessary to break or crush the rock to a greater or less extent before the precious mineral may be recovered. Where the minerals being recovered are precious stones, such as carbons, diamonds or any of the other precious stones, the crushing of the rocks in which they are enclosed may damage the precious stones themselves and reduce their value, for many of the precious stones, although they are often extremely hard, are at the same time very brittle. These precious stones in some localities are found associated with sedimentary sandstones and conglomerates. These sedimentary rocks are often extremely tough and resistant and attempts to crush the rocks by the usual metallurgical crushing machinery damage the precious minerals.

I have discovered that precious minerals and metals may be advantageously recovered from sedimentary sandstones and conglomerates without injury to the precious minerals and metals by the application of heat in accordance with the following method. By the term sedimentary I intend to comprise all those types of conglomerate rocks, the component parts of which may be of either or both igneous and/or sedimentary origin and do not wish to confine myself to the use of rocks which are of purely sedimentary origin, such as might be typified by certain types of limestone. The sedimentary rock in the mining operation is broken roughly into suitable size convenient for handling and heated in any convenient manner. The heating sets up internal stresses in the rock due to the differences in coefficients of expansion of the various components, and as a consequence the rock either crumbles to pieces in the heating chamber of the furnace or its structure is so weakened by its exposure to heat that it readily disintegrates in the subsequent processing.

There is no definite temperature which may be designated at which the disintegration may be said to take place, for this varies with each grade of rock being handled. Neither is it possible to state whether it is most advantageous to heat the rocks quickly or slowly. The heating may under some circumstances be advantageously followed immediately by sudden cooling as by immersion in a cold liquid such as water, but this has not been found to be always essential.

The rupture of the rock by heating is purely a physical phenomenon and is in no sense a chemical reaction. The roasting of ores in metallurgical processing has long been practiced, but these roasting steps are always associated with a chemical change in the ores such as roasts to drive off sulphur and sulphur compounds, usually a chemical reaction. There are also roasts which work in a reverse manner such as sulphidizing and chloridizing roasts where a reaction is brought about by means of the roast between certain constituents of the ores and added reagents such as sulphur and chlorine compounds. Certain other roasts are carried out in order to break down carbonate constituents of the ores by driving off carbon dioxide. In fact all metallurgical roasting and calcining processes are primarily designed to perform a chemical function.

The function of the heat treatment in accordance with the present invention is wholly to disintegrate the rocks. It is true that some of the metallurgical roasts do this but they accomplish this end by a chemical reaction on certain constituents of the rocks and the disintegration is purely a secondary function dependent on the chemical change.

As a specific example of the operation of the present invention the following may be taken as typical. A sedimentary conglomerate or puddingstone may contain such valuable mineral substances as gold, silver, platinum, carbons and diamonds. Such a sedimentary rock may have hardened into a very dense, tough and resistant rock, which would be expensive to crush by ordinary crushing methods. Such crushing would also crush and destroy the brittle carbons and diamonds before the pebbles were reduced. Upon exposure to heat, the difference in coefficient of expansion between the included pebbles and the cementing material causes the rock to split apart and frees the pebbles from the binding material. As a diamonds from sedimentary rocks which comprises artificially heating the rock to a substantial degree above normal atmospheric temperatures sufficient to induce material differences in expansion between the diamonds and their matrices and then quenching the so heated material in water.

8. The improvement in the recovery of carbons from sedimentary rocks which comprises artificially heating the rock to a substantial degree above normal atmospheric temperatures sufficient to induce material differences in expansion between the carbons and their matrices and then quenching the so heated material in water.

9. The improvement in the recovery of diamonds from sedimentary conglomerate rocks which comprises artificially heating the rock to a substantial degree above normal atmospheric temperatures sufficient to induce material differences in expansion between the rocks of the conglomerate and the matrix and between the diamonds and their matrices and then cooling the so heated materials.

10. The improvement in the recovery of carbons from sedimentary conglomerate rocks which comprises artificially heating the rock to a substantial degree above normal atmospheric temperatures sufficient to induce material differences in expansion between the rocks of the conglomerate and the matrix and between the carbons and their matrices and then cooling the so heated materials.

11. The improvement in the recovery of diamonds from sedimentary conglomerate rocks which comprises artificially heating the rock to a substantial degree above normal atmospheric temperatures sufficient to induce material differences in expansion between the rocks of the conglomerate and the matrix and between the diamonds and their matrices and then abruptly cooling the so heated materials.

12. The improvement in the recovery of carbons from sedimentary conglomerate rocks which comprises artificially heating the rock to a substantial degree above normal atmospheric temperatures sufficient to induce material differences in expansion between the rocks of the conglomerate and the matrix and between the carbons and their matrices and then abruptly cooling the so heated materials.

In testimony whereof I affix my signature.

TALBOTT HEWITT FRANCE.